Sept. 5, 1950
C. B. SCHNEIBLE ET AL
2,521,541
GAS PURIFYING BURNER
Filed May 18, 1945
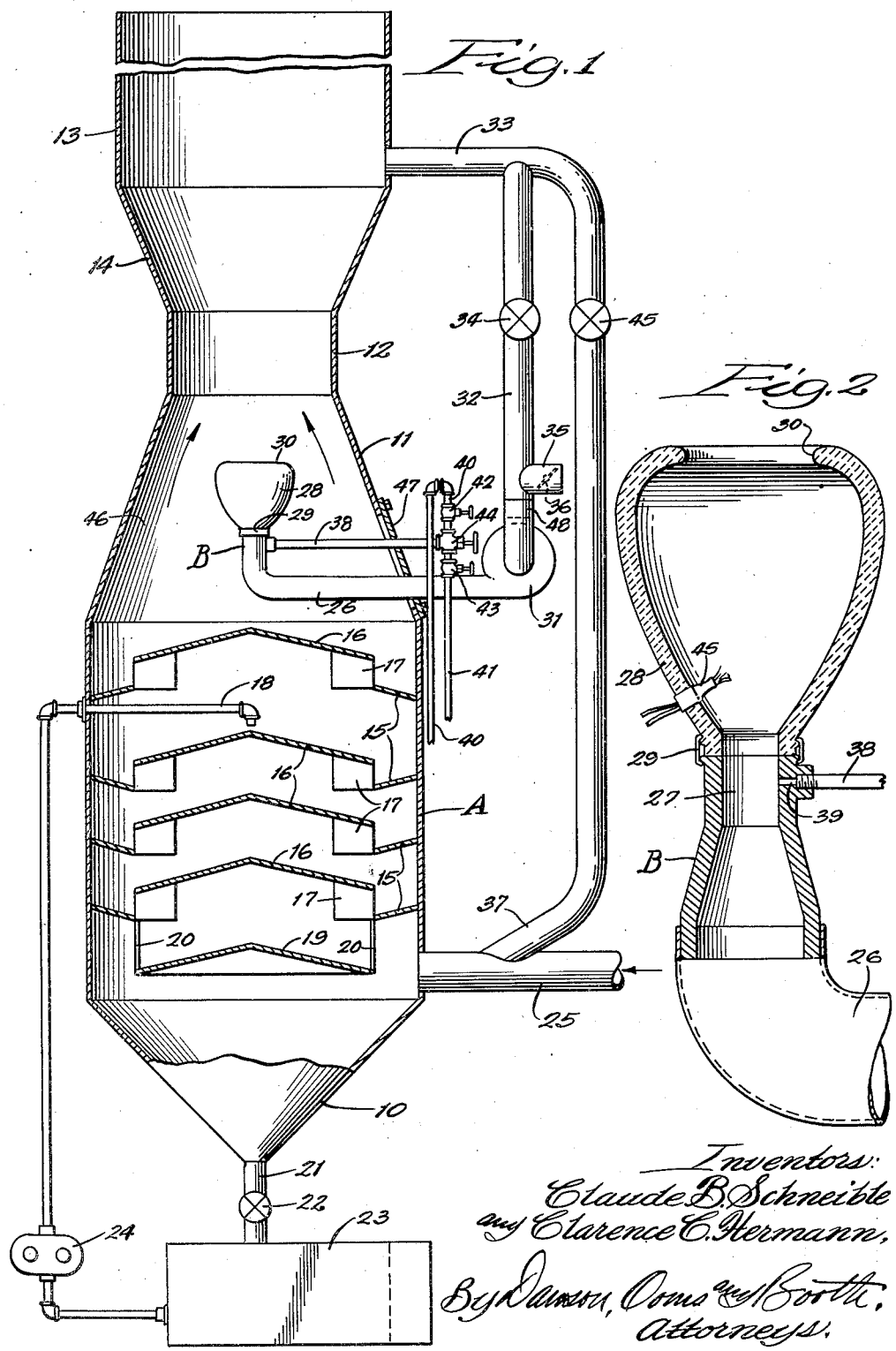
Inventors:
Claude B. Schneible
and Clarence C. Hermann,
By Dawson, Ooms and Booth,
Attorneys.

Patented Sept. 5, 1950

2,521,541

UNITED STATES PATENT OFFICE 2,521,541

GAS PURIFYING BURNER

Claude B. Schneible, Detroit, and Clarence C. Hermann, Grosse Pointe Park, Mich.; said Hermann assignor to said Schneible Application May 18, 1945, Serial No. 594,436

6 Claims. (Cl. 183—6)

This invention relates to separating apparatus, and particularly to improvements in columns, such as dust or foreign particle separating columns, distilling columns, diphlegmating towers, scrubbing towers, absorption towers, and similar towers.

An object of the invention is to provide a column or tower with means whereby the gases and entrained matter discharged from the tower will be subjected to a hot sterilizing and vaporizing blast, while at the same time creating suction within the column or tower. A further object is to provide means whereby through the introduction of fuel and contact with heated gases, a Venturi blast will be created to provide a high degree of suction within the column, while at the same time tending to burn any combustible material, to dissipate any residual particles high in the air, and maintaining the saturated air from the collector above the dew point. A further object is to provide means whereby a strong suction can be created within the tower without the use of moving parts, while at the same time reducing pressure on the inlet to the tower and subjecting all material leaving the tower to a hot sterilizing blast. Other specific objects and advantages will appear as the specification proceeds.

The invention is illustrated in a preferred embodiment, by the accompanying drawing, in which the apparatus is shown partly in vertical elevation and partly in section in Figure 1. Figure 2 shows the discharge jet in sectional view.

In the illustration given, A designates a column or tower having a conical outlet bottom portion 10 and an inclined top portion 11 merging into a throat 12 and stack 13. Stack 13 extends to a substantial elevation above the throat 12 and is connected to the throat by an inwardly-inclined portion 14.

The tower or column A may be provided in its interior with any suitable separating or treating means, as, for example, the type of structure shown in Claude B. Schneible Patent No. 2,114,786. In the illustration given, the casing A is provided with a series of baffles of the plate and ring type. 15 designates the baffle ring and 16 the plate. Between the plates and rings are secured vanes 17 which impart a whirling or circular motion to the gaseous medium and entrained material passing upwardly through the casing.

In the upper portion of the column is a liquid inlet pipe 18 through which water or other suitable liquid may be introduced to provide a counter-current wash of the incoming air, vapor, or other gaseous medium. The deflector 19 is suspended by rods 20 from the lowermost baffle ring. All of the baffle ring plate, vane, and deflector structure described is old and is set out herein merely to show the type of apparatus preferably employed.

Communicating with the conical bottom portion 10 is a sludge outlet pipe 21 controlled by valve 22. The pipe opens into a dewatering tank 23 or any other suitable sludge-treating apparatus. The water introduced through pipe 18 may be taken from any suitable source, or may, as illustrated in the drawing, be withdrawn by means of pump 24 and discharged through pipe 18.

The casing A is provided near its bottom with an intake pipe 25.

Supported in the upper portion of casing A is a fuel-burning discharge jet B which may be of any suitable construction. In the illustration given, an air intake pipe 26 merges into a Venturi mixing chamber 27 into which fuel may be injected, and above the mixing chamber is a burning or expulsion chamber 28. The walls of the member 28 are preferably formed of a refractory material or high temperature alloy and secured to the pipe 26 by a retaining collar 29, as illustrated, or by any other suitable means. The chamber provided by the refractory material or high temperature alloy is enlarged in its upper middle portion and then converges at 30 where the heated gases are liberated. Air for combustion is supplied through pipe 35 to the burner by any suitable compressed air source, such as fan 31, through air duct 26 attached to the lower end of burner B. Air flow is through throat 27 where fuel is picked up from fuel jet 39 and atomized. Fuel-air mixture passes into combustion chamber 28 where it is ignited by electric igniter 45. Rapid expansion of the air-fuel mixture causes a high velocity jet to pass through burner nozzle 30, thence through throat 12 inducing suction in the air passage 46 and likewise through the tower or column A. Burner B is adjustable with relation to throat 12 by means of the sliding plate 47 attached to stack base 11 and a slidable joint 48 in air pipe 32. Pipe 32 is provided with a valve 34 and near its lower end with an air intake 35. The valve for intake 35 may be a barometric damper 36 or any suitable valve which may be manually controlled or otherwise set for admitting any desired amount of air. Pipe 33 extends beyond the junction with pipe 32 and communicates at its lower end with pipe 25. Preferably, pipe 33, at its lower end, has a forwardly-inclined portion 37 which merges with pipe 25 at an angle. The object of by-pass line 33 is to introduce heated air into the collector intake (pipe 25) due to difference in pressure existing between discharge stack 13 and intake pipe 25. Pipe 33 is provided with a valve 45 which enables the entire conduit to be closed, when desired, or to be partially or fully opened as desired.

Any suitable means for injecting fuel into the mixing chamber 24 may be employed. In the illustration given, pipe 38 communicates with the mixing chamber through orifice 39. Pipe 38 communicates at its rear end with pipe 40 which may lead to a supply of kerosene or other fuel, and also with pipe 41 which preferably leads to a heavier fuel supply, such as fuel oil. Pipe 40 is controlled separately by valve 42, and pipe 41 is controlled by valve 43. The intake to pipe 38 is controlled by needle valve 44 which may be manually operated or which may, if desired, be controlled automatically by well-known means connected with the intake whereby the control will be responsive to the pressure and volume of the material in the intake line. Ignition of the burner is by electrical igniter 45.

In the operation of the apparatus and process, the air or other gaseous medium containing dust, liquid droplets, or other foreign particles, passes through intake line 25 and enters the base of the tower or column A under the influence of a reduced pressure within casing A. As the medium passes upwardly, it contacts water or other fluid and is given a whirling motion by the inclined vanes 17. In this operation, the heavier particles are washed downwardly and pass through outlet pipe 21 into the dewatering tank 23. Water may be withdrawn from the tank and passed through the pipe 18 into the upper portion of the tower. Solids may be withdrawn, according to well-known practice, from the dewatering tank 23, as desired.

The fuel-burning jet device in the upper portion of the casing discharges a blast of heated air through the constricted outlet 30 and upwardly through the constricted stack portion 12. The blast of air passing through the stack portion 12 induces a heavy suction in the interior of casing A and is highly effective in drawing the gaseous medium and entrained material through the ring, plate, and vane construction. Movement of air through the collector is also produced due to increase in temperature of the exhausted air at the burner location. At the same time, the heated blast effectively dissipates droplets of water and other volatile liquids, while at the same time it breaks up any frangible particles and discharges them through the elongated stack high into the air. Thus, foreign material discharged from the top of the column is not only sterile by virtue of the treatment described, but is also fragmented and so widely dissipated that it substantially disappears in the wind and heated air currents.

The combustion within the chamber 28 is accomplished by introducing fuel into the mixing chamber 27 and there contacting it with hot air recycled from the stack through lines 33, 32 and 26. Nice control of the amount of returned air and the amount of introduced fresh air is effected by means of valves 34 and 36. In starting the apparatus, it is preferred to introduce a light burning fuel, such as kerosene, and then, after the process has been in operation for awhile, to introduce heavier fuel, such as fuel oil. It will be understood, however, that varying conditions and varying results desired will modify the operation of the fuel-introducing means.

Pipe 33, which communicates with intake pipe 25, enables the operator to maintain any desired degree of low pressure on the intake, thus facilitating moving of material through pipe 25 into the chamber A. The communication of suction line 33 with pipe 25 reduces the pressure in pipe 25 and dust-laden air travels more rapidly through pipe 25 toward the point of junction with the pipe portion 37. The heavy material travels on by momentum into the separation chamber while only a portion of the lighter material reverses its direction and passes backwardly through pipe portion 37. The pipe 33 also enables the operator, if he desires, to pass a small portion of the lighter material in intake 25 into the stack 13 where it is subjected to the hot blast from the jet B.

In the construction of the apparatus described, it will be understood that any suitable material may be employed. If desired, refractory material may be used not only for the jet but also for the stack and upper portions of the apparatus. Under certain operating conditions, refractory material will not be needed because of the cooling effect of evaporated liquids, and other materials, such as steel, etc., may be used.

The new apparatus and process not only are effective in providing the high suction desired in the apparatus, but accomplish this without the use of moving parts. Further, the suction means provides a hot blast which eliminates the water or liquid particles which are necessarily entrained by the rotating column of air passing upwardly through the apparatus so that the material passing out of the stack may be rendered substantially free of moisture in liquid or unvaporized form in spite of the copious use of water, etc. in the washing or separating operation.

While in the foregoing description, we have set forth details for the purpose of illustrating one mode of operation of the apparatus and process, it will be understood that many improvements in such details may be readily made by those skilled in the art without departing from the spirit of our invention.

We claim:

1. In separating apparatus, a casing providing a chamber having an inlet in the lower portion and an outlet in the upper portion thereof, said outlet providing a Venturi passage, a fuel-burning jet mounted in the upper portion of said casing adapted to discharge heated fluid through said passage to create a suction within said chamber, baffles supported within said casing for rotating fluid into and through said outlet, and means for introducing a liquid upon said baffles traveling in countercurrent to said fluid.

2. In separating apparatus for the treatment of particle-containing fluid, a casing providing a chamber having an outlet in the upper portion thereof and an inlet in the lower portion thereof, said outlet providing a Venturi passage a fuel-burning jet mounted in the upper portion of said casing adapted to discharge heated fluid through said passage to create a suction within said chamber, means within the casing and below the jet for causing rotation of fluid passing through the casing from said inlet toward said outlet, means for introducing liquid into said casing below said jet, and means for withdrawing particles and liquid from the lower portion of said apparatus.

3. In separating apparatus, a casing providing a chamber having an inlet at one end and an outlet at the other, said outlet providing a Venturi passage, heat-generating means adjacent said outlet for creating a suction within said chamber, baffles supported within said casing between said heating means and said inlet, said baffles having vanes for producing a rotation of the fluid passing through said casing, and means for discharging liquid upon said baffles.

4. In separating apparatus, a casing providing a chamber having a tapered upper portion and a tapered lower portion, an outwardly-flared outlet passage communicating with said tapered upper portion of the casing to provide a Venturi passage, a fuel-burning jet in the upper portion of said casing for discharging heated air through said passage and creating a suction in said chamber, an inlet pipe communicating with the lower portion of said casing, baffles between said inlet pipe and said fuel-burning jet, and a conduit communicating with said outlet pipe and with said inlet pipe.

5. In separating apparatus, a casing providing a chamber having a tapered upper portion and a tapered lower portion, an outwardly-flared outlet passage communicating with said tapered upper portion of the casing to provide a Venturi passage, a fuel-burning jet in the upper portion of said casing for discharging heated air through said passage and creating a suction in said chamber, an inlet pipe communicating with the lower portion of said casing, baffles between said inlet pipe and said fuel-burning jet, and a conduit communicating with said outlet pipe and with said inlet pipe, said conduit having its lower portion joining said inlet pipe extending into said inlet pipe at an angle in the direction of flow of the fluid in said pipe whereby any fluid withdrawn through said conduit must reverse its direction in flow.

6. In separating apparatus, a casing providing a chamber having an outlet and a Venturi passage leading into said outlet in the upper portion of said chamber and having an inlet in its lower portion, baffles extending between said inlet and outlet for producing a rotation of fluid, means for discharging liquid onto the top of said baffles, liquid withdrawal means in the bottom of said casing, and a fuel-burning jet mounted in the upper portion of said casing and adapted to discharge heated fluid through said Venturi passage to create a suction within said chamber, said outlet extending above said Venturi passage in vertical alignment therewith.

CLAUDE B. SCHNEIBLE.
CLARENCE C. HERMANN.

REFERENCES CITED

The following references are of record in the file of this patent:

UNITED STATES PATENTS

| Number | Name | Date |
|---|---|---|
| 997,548 | Flynt | July 11, 1911 |
| 1,013,147 | Flynt | Jan. 2, 1912 |
| 1,081,227 | Foster | Dec. 9, 1913 |
| 1,273,402 | Parobi | July 23, 1918 |
| 1,411,729 | Keith | Apr. 4, 1922 |
| 1,612,915 | Goggin | Jan. 4, 1927 |
| 1,779,282 | Louis | Oct. 21, 1930 |
| 1,933,997 | Pasternack | Nov. 7, 1933 |
| 1,976,629 | Parkinson | Oct. 9, 1934 |
| 2,029,580 | Merkt | Feb. 4, 1936 |
| 2,197,595 | Schneible | Apr. 16, 1940 |